(12) United States Patent
Bai et al.

(10) Patent No.: US 8,126,086 B2
(45) Date of Patent: Feb. 28, 2012

(54) SYSTEM AND METHOD FOR IN-PHASE/QUADRATURE-PHASE (I/Q) MISMATCH MEASUREMENT AND COMPENSATION

(75) Inventors: Ziquan Bai, Beijing (CN); Hongwei Kong, Beijing (CN); Ya Jing, Beijing (CN)

(73) Assignee: Agilent Technologies, Inc., Santa Clara, CA (US)

( * ) Notice: Subject to any disclaimer, the term of this patent is extended or adjusted under 35 U.S.C. 154(b) by 757 days.

(21) Appl. No.: 12/023,135

(22) Filed: Jan. 31, 2008

(65) Prior Publication Data
US 2009/0196334 A1    Aug. 6, 2009

(51) Int. Cl.
*H04B 17/00*    (2006.01)
(52) U.S. Cl. .......................................... 375/319; 375/235
(58) Field of Classification Search .................. 375/345, 375/235, 233, 350, 319, 316, 226; 455/295, 455/296
See application file for complete search history.

(56) References Cited

U.S. PATENT DOCUMENTS

| | | | |
|---|---|---|---|
| 2005/0047384 A1* | 3/2005 | Wax et al. ..................... | 370/338 |
| 2006/0198461 A1* | 9/2006 | Hayase ........................ | 375/267 |
| 2006/0203901 A1* | 9/2006 | Tan et al. ..................... | 375/233 |
| 2006/0252392 A1* | 11/2006 | Beamish et al. ............... | 455/126 |
| 2007/0047672 A1* | 3/2007 | Kim ............................. | 375/329 |
| 2008/0063113 A1* | 3/2008 | Gao et al. ..................... | 375/296 |
| 2008/0165874 A1* | 7/2008 | Steele et al. .................. | 375/261 |
| 2008/0273636 A1* | 11/2008 | Zhu et al. ..................... | 375/345 |
| 2009/0122918 A1* | 5/2009 | Li et al. ........................ | 375/317 |

OTHER PUBLICATIONS

Ya-zhuo Li, Ming-yu Zhou , Ping Zhang, "RF power and I/Q imbalance calibration in B3G/4G MIMO-OFDM systems", Beijing University of Posts and Telecommunications, Beijing, China, Jun. 2007.*
Alireza Tarighat and Ali H. Sayed, "Joint Compensation of Transmitter and Receiver Impairments in OFDM Systems", University of California, IEEE, Jan. 2007.*
Angrisani, L., Ghidini, I. and Vadursi, M., "A New Method for I/Q Impairment Evaluation in OFDM Transmitters", Ottawa, Canada, IEEE, May 2005.*
Gabor Zoka, "Refined I/Q Imbalance Measurements", Jun. 2004.*

* cited by examiner

*Primary Examiner* — Chieh M Fan
*Assistant Examiner* — Aristocratis Fotakis

(57) ABSTRACT

A system for determining in-phase and quadrature-phase mismatch in a multiple-input, multiple-output (MIMO) communication architecture includes at least one transmitter coupled to at least one receiver and an in-phase (I) signal, quadrature-phase (Q) signal mismatch element configured to receive and Q signal components over at least one communication channel, the I/Q signal mismatch element also configured to provide a signal representing gain imbalance, a signal representing quadrature error and a signal representing I/Q offset.

10 Claims, 12 Drawing Sheets

SYSTEM AND METHOD FOR IN-PHASE/QUADRATURE-PHASE (I/Q) MISMATCH MEASUREMENT AND COMPENSATION

BACKGROUND

Many communications systems employ communication protocols in which data to be communicated is converted to a system that includes in-phase (I) and quadrature-phase (Q) components. The in-phase and the quadrature-phase components are shifted in phase by an angular amount, such as, for example, 90 degrees. The data signal is impressed on the in-phase and the quadrature-phase signal components by a transmitter and recovered by a receiver. One example of a communication system that employs in-phase and quadrature-phase components is what is referred to as a multiple input multiple output (MIMO) communication system that uses orthogonal frequency division multiplexing (OFDM) in a multiple-antenna arrangement and that complies with communication standard IEEE 802.11n.

In any communication system that uses in-phase and quadrature-phase signal components, the quality of the signal transmission is dependent upon the relationship between the in-phase and the quadrature-phase components. If the in-phase and the quadrature-phase components are not properly matched, also referred to as "I/Q mismatch," degradation of the communication signal occurs. There are typically three types of I/Q mismatch. These are gain imbalance, quadrature error and I/Q offset. Gain imbalance is caused by a difference in gain between the in-phase component and the quadrature-phase component. Quadrature error is caused by an error in the phase rotation between the between the in-phase component and the quadrature-phase component. I/Q offset is caused by the leakage of a direct current (DC) signal at the receiver input.

I/Q mismatch occurs because of non-ideal modulator and demodulator elements in which the upconverters and attenuators of the I and Q channels are mismatched. I/Q mismatch results in serious performance degradation because it causes inter-carrier interference. A MIMO system is more likely to be influenced by I/Q mismatch than a single input single output (SISO) communication system because there are multiple modulators and demodulators, each of which can introduce I/Q mismatch. Further, the I/Q mismatch may result in inter-channel interference.

The measurement of I/Q mismatch for OFDM and MIMO OFDM systems is challenging in that the I/Q mismatch will result in large channel estimation error if the I/Q mismatch impairment is not correctly compensated. Further, the accurate measurement of I/Q mismatch requires decoupling the influence of I/Q mismatch on the channel estimation. This is especially true for a MIMO communication system under a fading channel situation.

Prior attempts of I/Q mismatch compensation fail to address each of the I/Q mismatch parameters, and further, fail to address I/Q mismatch compensation under a MIMO fading channel situation. Prior attempts at I/Q mismatch measurement and compensation only considered the measurement of the ratio of gain imbalance to quadrature error. Other prior attempts at I/Q mismatch measurement and compensation provided measurement methods for gain imbalance and quadrature error for a SISO communication system without considering the influence of channel fading. Furthermore, these prior attempts all require a specially designed test signal.

Therefore, it would be desirable to have a way to measure and compensate I/Q mismatch, including measuring gain imbalance, quadrature error and I/Q offset under a MIMO fading channel situation without using specially designed signals.

SUMMARY

An embodiment of a system for determining in-phase and quadrature-phase mismatch in a multiple-input, multiple-output (MIMO) communication architecture includes at least one transmitter coupled to at least one receiver and an in-phase (I) signal, quadrature-phase (Q) signal mismatch element configured to receive I and Q signal components over at least one communication channel, the I/Q signal mismatch element also configured to provide a signal representing gain imbalance, a signal representing quadrature error and a signal representing I/Q offset.

Other embodiments and methods of the invention will be discussed with reference to the figures and to the detailed description.

BRIEF DESCRIPTION OF THE FIGURES

The invention will be described by way of example, in the description of exemplary embodiments, with particular reference to the accompanying figures.

DETAILED DESCRIPTION

Figure 1:
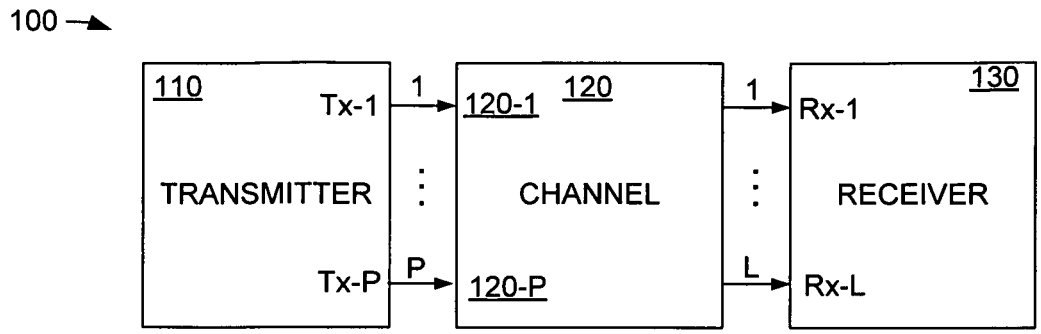
FIG. 1 is a schematic diagram illustrating a basic communication system.

The system and method for in-phase/quadrature-phase (I/Q) mismatch measurement and compensation can be implemented on a measurement instrument or can be implemented in a receiver of a communication device for compensating for I/Q mismatch, including the joint measurement of gain imbalance, quadrature error and I/Q offset.

As will be described below, the system and method for in-phase/quadrature-phase (I/Q) mismatch measurement and compensation decouples the influence of the fading channel on the measurement of the I/Q mismatch parameters. The system and method for in-phase/quadrature-phase (I/Q) mismatch measurement and compensation can be implemented on a measurement instrument for measuring MIMO I/Q mismatch or can be implemented in a MIMO-OFDM receiver to measure and compensate for the influence of I/Q mismatch.

Further, the system and method for in-phase/quadrature-phase (I/Q) mismatch measurement and compensation can use either a standard signal or a specially designed signal to perform the measurement.

The system and method for in-phase/quadrature-phase (I/Q) mismatch measurement and compensation can be used in the scenario of a test and measurement case in which the receiver of the user device is directly connected to the test instrument through a cable; and in the scenario of a MIMO OFDM communication environment having multiple transmitters and receivers.

For the test and measurement case in which the receiver of the user device is directly connected to the test instrument through a cable, a fast efficient I/Q mismatch measurement method is derived with the assumption of no coupling between different channels. With the assumption that the channel is quasi-stationary (stable for two successive OFDM symbols), the influence of the channel fading can be eliminated by determining a ratio of two consecutive symbols. After measuring the I/Q mismatch parameters, further accurate measurement results of channel response can be obtained without the influence of I/Q mismatch.

For a MIMO OFDM communication environment including multiple transmitters and receivers and experiencing channel fading, an iterative method derived from the SAGE algorithm performs the joint estimation of channel response and I/Q mismatch parameters. The SAGE algorithm (Jeffrey A. Fessler, and Alfred O. Hero, "Space-Alternating Generalized Expectation-Maximization Algorithm", Signal Processing IEEE Trans. on, pp. 2664-2677, Vol. 42, No. 10, October 1994.) is well known in the field of array processing. The SAGE algorithm is a general method for joint estimation of multiple parameters. The system and method for in-phase/quadrature-phase (I/Q) mismatch measurement and compensation is derived from the basic idea of the SAGE algorithm and is applied to the joint estimation of I/Q mismatch and channel response for MIMO systems under fading channel conditions. The system and method for in-phase/quadrature-phase (I/Q) mismatch measurement and compensation obtains accurate measurement of I/Q mismatch and channel parameters, while taking into account coupling between multiple transmit-receive channels.

Further, the system and method for in-phase/quadrature-phase (I/Q) mismatch measurement and compensation works with both standard signals and specially designed test signals.

FIG. 1 is a schematic diagram illustrating a basic communication system. The communication system includes a transmitter 110, a channel 120 and a receiver 130. The transmitter 110 can be any transmitter and can be located in, for example, a portable cellular communication device, a personal computer (PC), a personal digital assistant (PDA), a portable game player, a wireless local area network (LAN) device, or any other communication device. In an embodiment, the transmitter has a plurality of transmit channels, each channel having a corresponding antenna, which are referred to as Tx-1 through Tx-P.

The receiver 130 can be any receiver adapted to receive the transmissions from the transmitter 110 and can be located in, for example, a portable cellular communication device, a personal computer (PC), a personal digital assistant (PDA), a portable game player, a wireless local area network (LAN) device, or any other communication device. In an embodiment, the receiver 130 has a plurality of receive channels, each channel having a corresponding antenna, which are referred to as Rx-1 through Rx-L, where the number of transmitters and the number of receivers are greater than 1. Further, the transmitter 110 and the receiver 130 can be incorporated into a transceiver and the transceiver can communicate with another transceiver according to the principles described below. In some nomenclature, and in some of the equations below, there are said to be "P" transmitter antennas and "L" receiver antennas, associated with the transmitter 110 and receiver 130.

The channel 120 represents the transmission environment between the transmitter and the receiver, and can be any wired or wireless communication channel. Due to the various application scenarios, there are many channel types. Most channel types will have a direct influence on I/Q mismatch. Each of a number of individual transmitters within the transmitter 110 can be wirelessly coupled to a corresponding one of a number of receivers in the receiver 130. In such a MIMO configuration, each transmitter-receiver pair communicates over a separate wireless communication channel 120-1 through 120-P.

Figure 2:
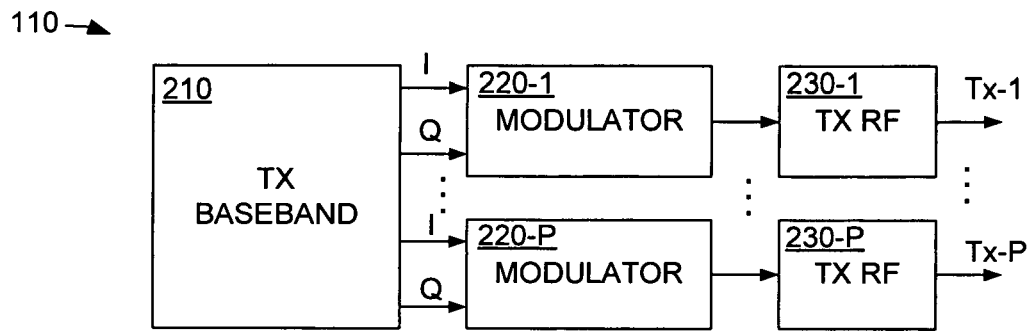
FIG. 2 is a schematic diagram illustrating the basic components of the transmitter of FIG. 1.

FIG. 2 is a schematic diagram illustrating the basic components of the transmitter 110 of FIG. 1. The transmitter 110 includes a transmit baseband module 210, a plurality of modulators 220-1 through 220-P, and a plurality of transmit radio frequency (RF) modules 230-1 through 230-P, corresponding to the number of channels. The transmit baseband module 210 performs baseband signal processing and provides in-phase and quadrature-phase components of a transmit signal to each modulator 220. In an embodiment, the transmit signal provided by the transmit baseband module 210 includes an in-phase component and a quadrature-phase component. Each modulator 220 modulates the baseband signal and optionally upconverts the transmit signal to an intermediate frequency (IF) or to an RF signal level. The modulator provides the modulated signal to a corresponding transmit RF module 230. Each transmit RF module 230 generally includes one or more amplification stages to amplify the modulated signal for transmission over the channel 120 (FIG. 1).

Figure 3:
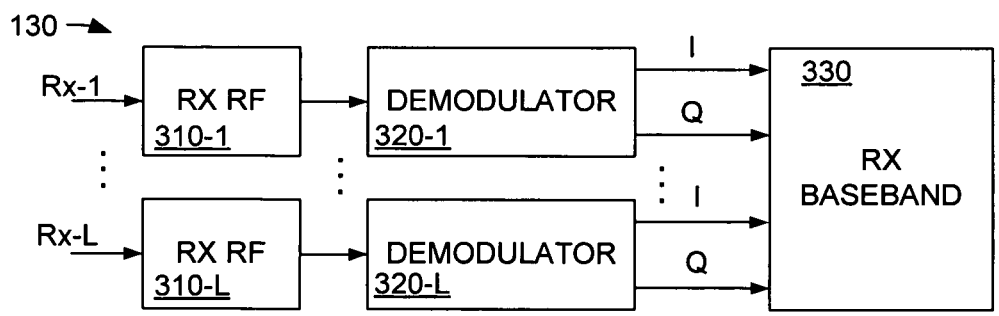
FIG. 3 is a schematic diagram illustrating the basic components of the receiver of FIG. 1.

FIG. 3 is a schematic diagram illustrating the basic components of the receiver 130 of FIG. 1. The receiver 130 includes a plurality of receive RF modules 310-1 through 310-L, and a plurality of demodulators 320-1 through 320-L, corresponding to the corresponding to the number of channels. The receiver 130 also includes a receive baseband module 330. Each receive RF module 310 receives and filters the transmit signal of a respective channel received over the channel 120 (FIG. 1). Each receive RF module 310 provides the received signal to a corresponding demodulator 320. Each demodulator 320 demodulates the received signal to recover the information signal. The information signal includes an in-phase component, $I_{rx}(t)$ and a quadrature-phase component $Q_{rx}(t)$ for each channel. The in-phase component, $I_{rx}(t)$ and the quadrature-phase component, $Q_{rx}(t)$, are provided to the receive baseband module 330 where the information contained in the in-phase component and the quadrature-phase component are recovered to baseband level.

Figure 4:
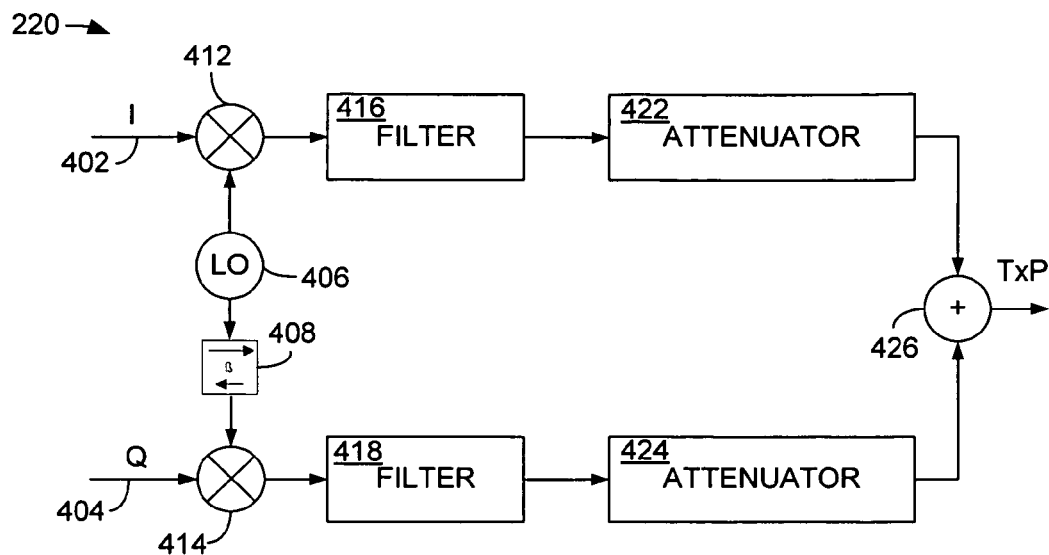
FIG. 4 is a schematic diagram illustrating an exemplary modulator of FIG. 2.

FIG. 4 is a schematic diagram illustrating an exemplary modulator 220 of FIG. 2. The modulator 220 includes a mixer 412 and a mixer 414. The mixer 412 receives the in-phase signal on connection 402 and the mixer 414 receives the quadrature-phase signal on connection 404. The mixer 412 also receives a local oscillator (LO) signal from a local oscillator 406. The local oscillator 406 can be any frequency generations device, such as a crystal oscillator, a frequency synthesizer, etc., that generates the desired reference frequency. The signal provided by the local oscillator 406 is a reference signal that is used by the mixer 412 to upconvert the in-phase signal on connection 402 to a transmit frequency. The mixer 412 can perform direct upconversion, in which the transmit signal is upconverted directly to a radio frequency (RF) transmit signal, or may perform upconversion in which the transmit signal is first converted to an intermediate frequency (IF) prior to upconversion to the RF transmit frequency.

The local oscillator also supplies the LO signal to a phase shifter (also referred to as a phase rotator) 408. The phase shifter 408 alters the phase of the LO signal received from the local oscillator 406 by a predetermined amount. In an embodiment, the phase shifter 408 alters the LO signal by 90 degrees to correspond to the 90 degree phase difference between the in-phase and quadrature signals. In an alternative embodiment, the phase shifter 408 may alter the phase of the LO signal by an amount other than 90 degrees, such as, for example, 45 degrees. The amount of phase offset generated by the phase shifter is determined by specific application.

The phase-shifted LO signal is supplied to the mixer 414. The mixer 414 uses the phase-shifted LO signal as a reference signal to upconvert the quadrature-phase signal on connection 402 to a transmit frequency. The mixer 414 can perform direct upconversion, in which the transmit signal is upconverted directly to a radio frequency (RF) transmit signal, or may perform upconversion in which the transmit signal is first converted to an intermediate frequency (IF) prior to upconversion to the RF transmit frequency.

The output of the mixer 412 is provided to a filter 416 and the output of the mixer 414 is provided to a filter 418. The filter 416 filters the in-phase signal to remove unwanted components and supplies the filtered signal to an attenuator 422. The attenuator 422 modifies the level of the in-phase signal and supplies the in-phase signal to an adder 426.

The filter 418 filters the quadrature-phase signal to remove unwanted components and supplies the filtered signal to an attenuator 424. The attenuator 424 modifies the level of the quadrature-phase signal and supplies the quadrature—phase signal to the adder 426.

The adder 426 combines the in-phase signal and the quadrature-phase signal and generates a transmit signal, TxP.

Figure 5:
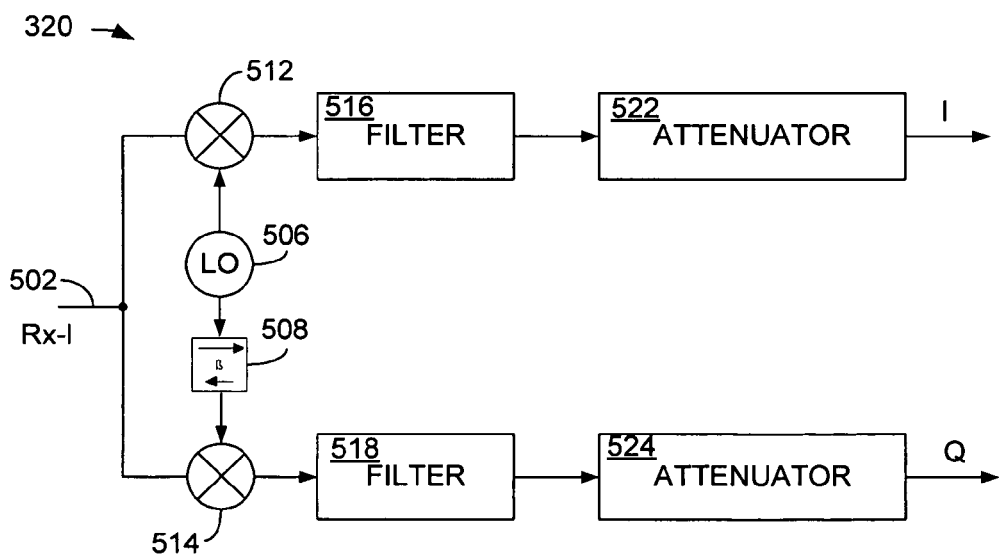
FIG. 5 is a schematic diagram illustrating an exemplary demodulator of FIG. 3.

FIG. 5 is a schematic diagram illustrating an exemplary demodulator 320 of FIG. 3. The demodulator 320 receives a receive signal, Rx-1 on connection 502. The receive signal is provided to a mixer 512 and a mixer 514. The mixer 512 also receives a local oscillator (LO) signal from a local oscillator 506. The local oscillator 506 can be any frequency generation device, such as a crystal oscillator, a frequency synthesizer, etc., that generates the desired reference frequency and can be similar to the local oscillator 406 (FIG. 4). The signal provided by the local oscillator 506 is a reference signal that is used by the mixer 512 to downconvert the receive signal on connection 502 to obtain the in-phase signal. The mixer 512 can perform direct downconversion, in which the received signal is downconverted directly to baseband, or near baseband, or may perform downconversion in which the receive signal is first converted to an intermediate frequency (IF) prior to downconversion to baseband.

The local oscillator also supplies the LO signal to a phase shifter (also referred to as a phase rotator) 508. The phase shifter 508 alters the phase of the LO signal received from the local oscillator 506 by a predetermined amount. In an embodiment, the phase shifter 508 alters the LO signal by 90 degrees to correspond to the 90 degree phase difference between the in-phase and quadrature signals. In an alternative embodiment, the phase shifter 508 may alter the phase of the LO signal by an amount other than 90 degrees, such as, for example, 45 degrees. The amount of phase offset generated by the phase shifter is determined by specific application.

The phase-shifted LO signal is supplied to the mixer 514. The mixer 514 uses the phase-shifted LO signal as a reference signal to downconvert the receive signal on connection 502 to obtain the quadrature-phase signal. The mixer 514 can perform direct downconversion, in which the received signal is downconverted directly to baseband, or near baseband, or may perform downconversion in which the receive signal is first converted to an intermediate frequency (IF) prior to downconversion to baseband.

The output of the mixer 512 is provided to a filter 516 and the output of the mixer 514 is provided to a filter 518. The filter 516 filters the in-phase signal to remove unwanted components and supplies the filtered signal to an attenuator 522. The attenuator 522 modifies the level of the in-phase signal and supplies an in-phase information signal, I.

The filter 518 filters the quadrature-phase signal to remove unwanted components and supplies the filtered signal to an attenuator 524. The attenuator 524 modifies the level of the quadrature-phase signal and supplies the quadrature—phase information signal, Q.

The system and method for in-phase/quadrature-phase (I/Q) mismatch measurement and compensation addresses the three main types of I/Q mismatch. These are gain imbalance, quadrature error and I/Q offset. Gain imbalance is caused by different gain of the attenuators, 422 and 424, in the modulator 220 and the attenuators, 522 and 524, in the demodulator 320. Quadrature error is cause by phase rotation error with respect to 90 degrees and can be imparted by the phase shifter 408 in the modulator 220 and by the phase shifter 508 in the demodulator 320. I/Q offset has several sources such as, for example, DC (Direct Current) leakage of the filters 416 and 418 in the modulator 220 and the filters 516 and 518 in the demodulator 320.

Figure 6:
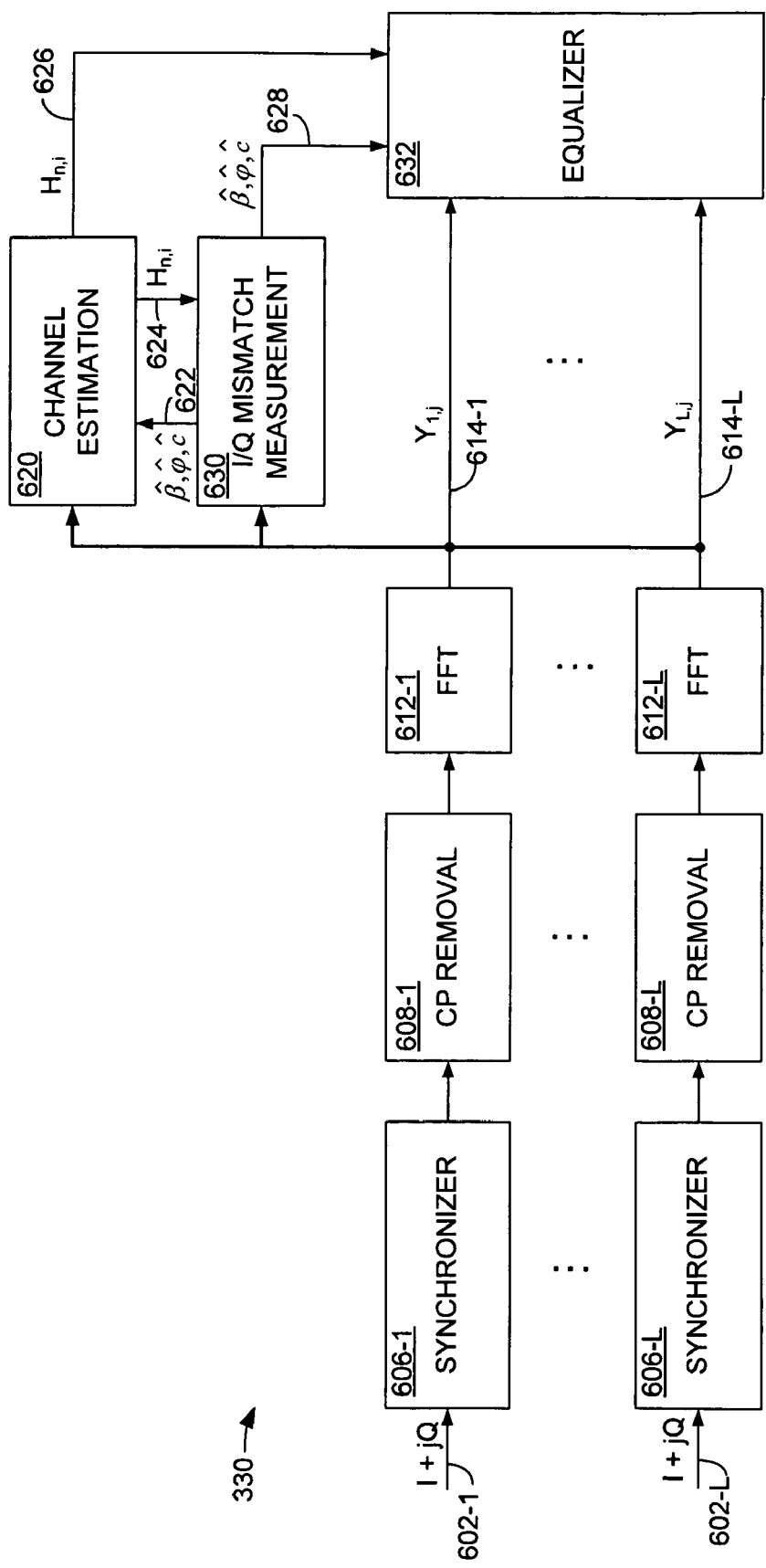
FIG. 6 is a schematic diagram illustrating an embodiment of the receive baseband module of FIG. 3.

FIG. 6 is a schematic diagram illustrating an embodiment of the receive baseband module 330 of FIG. 3.

For each channel, the in-phase (I) and quadrature-phase (Q) signals received from the demodulator 320 (FIG. 3) are combined into complex form (I+jQ) and provided to a synchronizer 606. In the example shown in FIG. 6, the signal on connection 602-1 is provided to a synchronizer 606-1 and the signal on connection 602-L is provided to a synchronizer 606-L. The number of synchronizers corresponds to the number of channels (i.e., the number of transmitters P (FIG. 1) and receivers L (FIG. 1)).

After synchronization, each receive signal is provided to a corresponding cyclic prefix removal element 608-1 through 608-L. The cyclic prefix removal elements 608-1 through 608-L remove the cyclic prefix from the OFDM symbol so that the original signal can be recovered in the time domain.

After the cyclic prefix is removed from each receive signal, the receive signals are supplied to corresponding fast Fourier transform (FFT) elements 612.

The FFT elements 612-1 through 612-L convert the receive signals to the frequency domain. The output of the FFT element 612-1 is supplied over connection 614-1 and is referred to as $Y_{1,j}$. The output of the FFT element 612-L is supplied over connection 614-L and is referred to as $Y_{L,j}$. As used in FIG. 6, the first term in the subscript ($Y_{1,j}$) refers to the first channel in FIG. 1 and the first term in the subscript ($Y_{L,j}$) refers to the last channel, L, in FIG. 1.

The output of the FFT elements 612-1 through 612-L is used for I/Q mismatch measurement and channel estimation.

The signals on connections 614-1 and 614-L are supplied to an equalizer 632, to a channel estimation element 620 and to an I/Q mismatch element 630.

The channel estimation element 620 measures the response of the channel and provides an indicator, $H_{n,i}$, that is a signal having a term that defines the channel response. The measurement results can be sent to both the channel estimation element 620 and equalizer 632 for compensation of I/Q mismatch. The I/Q mismatch element 630 receives the signals $Y_{1,j}$ and $Y_{L,k}$ on connections 614-1 and 614-L, and provides the terms $\hat{\beta}$ $\hat{\phi}$ and $\hat{c}$ that are signals representing estimates for I/Q imbalance, quadrature error and I/Q offset, respectively, over connection 622 to the channel estimation element 620 and to the equalizer 632 over connection 628. The terms $\beta$, $\phi$, c indicate real value while the terms $\hat{\beta}$ $\hat{\phi}$ and $\hat{c}$ indicate estimation results which may contain error.

The output of the channel estimation element 620 on connection 626, $H_{n,i}$, and the output of the I/Q mismatch element 630 on connection 628, $\hat{\beta}$ $\hat{c}$ $\hat{\phi}$, is supplied to the equalizer 632. The equalizer 632 recovers the transmitted symbols "X" from received symbols "Y." For example, after the estimation results of $\beta$, $\phi$, c and H are obtained, the equalizer 632 obtains the symbols "X" by solving equation Eq. (1).

The compensation can be performed using either the real time measurement results or using results stored some time before. The compensation can be performed in different ways. For example, after obtaining the estimation results $\hat{\beta}$ $\hat{c}$ $\hat{\phi}$ and substituting them into Eq. 1, X becomes the only unknown variable in Eq. 1 and then X could be solved using Eq. 1. The process of solving for X from Eq. 1 is one type of compensation for I/Q mismatch. Using real time measurement results means that the estimation results of I/Q mismatch are updated once for every OFDM symbol. Using stored results means estimation results of I/Q mismatch are updated once for every several OFDM symbols.

Embodiment 1

Transmitter and Receiver Directly Connected

If the transmitter and receiver are directly connected using, for example, a cable or other direct connection, such that the output port of each transmitter is connected to an input port of the receiver, the output of the FFT 612 at the $n^{th}$ Rx stream can be expressed as $$Y_{k,n,i} = H_{k,n,i}\left[\frac{1+\beta+e^{j\varphi}}{2}X_{k,n,i} + \frac{1+\beta-e^{j\varphi}}{2}X^*_{N-k,n,i} + \left(\frac{1+\beta+e^{j\varphi}}{2}c + \frac{1+\beta-e^{j\varphi}}{2}c^*\right)\delta(k)\right] + W_{k,n,i} \quad \text{Eq. (1)}$$

where $X_{k,n,i}$ is the transmitted symbol carried by the $k^{th}$ subcarrier of the $i^{th}$ OFDM symbol at the $n^{th}$ transmitter antenna. The terms, $\beta$, $\phi$, c represent I/Q imbalance, quadrature error and I/Q offset, respectively. The term $H_{k,n,i}$ is the frequency response at the $k^{th}$ subcarrier of the $i^{th}$ OFDM symbol transmitted from the $n^{th}$ transmitter antenna to the $n^{th}$ input port of test instrument. The term $W_{k,n,i}$ is the noise. N is the size of FFT. Given that $\phi$ is small enough, Eq. (1) can be rewritten by approximation as $$Y_{k,n,i} = H_{k,n,i}\left[\frac{2+\beta+j\varphi}{2}X_{k,n,i} + \frac{\beta-j\varphi}{2}X^*_{N-k,n,i} + \left(\frac{2+\beta+j\varphi}{2}c_n + \frac{\beta-j\varphi}{2}c^*_n\right)\delta(k)\right] + W_{k,n,i} \quad \text{Eq. (2)}$$

Considering all the subcarriers except for the subcarrier with an index k=0, Eq. (2) can be expressed in vector mode as $$Y_{n,i} = H_{n,i} * \left[X_{n,i}\frac{2+\beta+j\varphi}{2} + JX^*_{n,i}\frac{\beta-j\varphi}{2}\right] + W_{n,i} \quad \text{Eq. (3)}$$

where '.*' indicates the operation of an elementary product, $X_{n,i} = [X_{1,n,i}, \ldots, X_{M,n,i}]^T$, $Y_{n,i} = [Y_{1,n,i}, \ldots, Y_{M,n,i}]^T$, $H_{n,i} = [H_{1,n,i}, \ldots, H_{M,n,i}]^T$, $W_{n,i} = [W_{1,n,i}, \ldots, W_{M,n,i}]^T$, $$J = \begin{bmatrix} & & & 1 \\ & 0 & 1 & \\ & & \iddots & \\ & 1 & 0 & \\ 1 & & & \end{bmatrix}_{M \times M}$$

M is the number of the subcarrier used. J is an M×M exchange matrix with nonzero elements only on its orthogonal diagonal.

The term $H_{n,i}$ varies slowly among consecutive OFDM symbols, i.e. $H_{n,i} \cong H_{n,i+1}$. As a result, the unknown channel response can be eliminated by the following operation:

$$Z_{n,i} = Y_{n,i}./Y_{n,i-1} = (H_{n,i}/H_{n,i+1}).* \quad \text{Eq. (4)}$$

$$\left[X_{n,i}\frac{2+\beta+j\varphi}{2} + JX^*_{n,i}\frac{\beta-j\varphi}{2} + W_{n,i}./H_{n,i}\right]./$$

$$\left[X_{n,i+1}\frac{2+\beta+j\varphi}{2} + JX^*_{n,i+1}\frac{\beta-j\varphi}{2} + W_{n,i+1}./H_{n,i+1}\right] \approx$$

$$\left[X_{n,i}\frac{2+\beta+j\varphi}{2} + JX^*_{n,i}\frac{\beta-j\varphi}{2} + W_{n,i}./H_{n,i}\right]./$$

$$\left[X_{n,i+1}\frac{2+\beta+j\varphi}{2} + JX^*_{n,i+1}\frac{\beta-j\varphi}{2} + W_{n,i+1}./H_{n,i+1}\right]$$

where './' indicates the operation of elementary quotient. Eq. (4) can be rewritten in the standard form with respect to $\beta$ and $\phi$ as $$A_{n,i} \begin{bmatrix} \beta \\ \varphi \end{bmatrix} = b_{n,i} + U_{n,i} \qquad \text{Eq. (5)}$$

where $$A_{n,i} = \begin{bmatrix} \text{Re}(X_{n,i} - Z_{n,i} \cdot *X_{n,i+1} + JX^*_{n,i} - Z_{n,i} \cdot *(JX^*_{n,i+1})) & -\text{Im}(X_{n,i} - Z_{n,i} \cdot *X_{n,i+1} - JX^*_{n,i} + Z_{n,i} \cdot *(JX^*_{n,i+1})) \\ \text{Im}(X_{n,i} - Z_{n,i} \cdot *X_{n,i+1} + JX^*_{n,i} - Z_{n,i} \cdot *(JX^*_{n,i+1})) & \text{Re}(X_{n,i} - Z_{n,i} \cdot *X_{n,i+1} - JX^*_{n,i} + Z_{n,i} \cdot *(JX^*_{n,i+1})) \end{bmatrix},$$

$$b_{n,i} = \begin{bmatrix} \text{Re}(Z_{n,i} \cdot *X_{n,i+1} - X_{n,i}) \\ \text{Im}(Z_{n,i} \cdot *X_{n,i+1} - X_{n,i}) \end{bmatrix} \cdot 2, \text{ and } U_{n,i} \text{ is the noise term.}$$

The least squares (LS) solution for Eq. (5) is $$\begin{bmatrix} \hat{\beta} \\ \hat{\varphi} \end{bmatrix} = (A^H_{n,i} A_{n,i})^{-1} A^H_{n,i} b_{n,i} \qquad \text{Eq. (6)}$$

After obtaining $\hat{\beta}$ and $\hat{\varphi}$, the I/Q offset c can be derived from Eq. (2) by the following operation:

$$Z_{0,n,i} = \frac{Y_{0,n,i}}{Y_{0,n,i+1}} \qquad \text{Eq. (7)}$$

$$= \frac{H_{0,n,i}}{H_{0,n,i+1}} \cdot \frac{(X_{0,n,i} + c)\frac{2+\beta+j\varphi}{2} + (X^*_{0,n,i} + c^*)\frac{\beta-j\varphi}{2} + W_{0,n,i}/H_{0,n,i}}{(X_{0,n,i+1} + c)\frac{2+\beta+j\varphi}{2} + (X^*_{0,n,i+1} + c^*)\frac{\beta-j\varphi}{2} + W_{0,n,i+1}/H_{0,n,i+1}}$$

$$\approx \frac{(X_{0,n,i} + c)\frac{2+\beta+j\varphi}{2} + (X^*_{0,n,i} + c^*)\frac{\beta-j\varphi}{2} + W_{0,n,i}/H_{0,n,i}}{(X_{0,n,i+1} + c)\frac{2+\beta+j\varphi}{2} + (X^*_{0,n,i+1} + c^*)\frac{\beta-j\varphi}{2} + W_{0,n,i+1}/H_{0,n,i+1}}$$

Eq. (7) can be rewritten in the standard form of equation with respect to c as $$D_{n,i} \begin{bmatrix} \text{Re}(c) \\ \text{Im}(c) \end{bmatrix} = e_{n,i} + V_{n,i} \text{ where} \qquad \text{Eq. (8)}$$

$$D_{n,i} = \begin{bmatrix} \text{Re}((1-Z_{0,n,i})(1+\beta)) & -\text{Im}((1-Z_{0,n,i})(1+j\varphi)) \\ \text{Im}((1-Z_{0,n,i})(1+\beta)) & \text{Re}((1-Z_{0,n,i})(1+j\varphi)) \end{bmatrix},$$

$$e_{n,i} = \begin{bmatrix} \text{Re}((2+\beta+j\varphi)(Z_{0,n,i} \cdot *X_{0,n,i+1} - X_{0,n,i}) + (\beta-j\varphi)(Z_{0,n,i} \cdot *X^*_{0,n,i+1} - X^*_{0,n,i})) \\ \text{Im}((2+\beta+j\varphi)(Z_{0,n,i} \cdot *X_{0,n,i+1} - X_{0,n,i}) + (\beta-j\varphi)(Z_{0,n,i} \cdot *X^*_{0,n,i+1} - X^*_{0,n,i})) \end{bmatrix} \cdot (0.5)$$

and $V_{n,i}$ is the noise term. The LS solution for Eq. (8) is $$\begin{bmatrix} \text{Re}(\hat{c}) \\ \text{Im}(\hat{c}) \end{bmatrix} = [(D^H_{n,i} D_{n,i})^{-1} D^H_{n,i} e_{n,i}]_{\beta=\hat{\beta},\varphi=\hat{\varphi}} \qquad \text{Eq. (9)}$$

Eq. (9) can only be used if $X_{0,n,i+1} \neq X_{0,n,i}$, otherwise $e_{n,i} \to 0$ and only zero solution can be obtained from Eq. (9). If $X_{0,n,i+1} = X_{0,n,i}$, estimation of c can be done after compensation of I/Q imbalance and quadrature error and channel estimation. After that, c can be directly obtained from Eq. (2).

$$\begin{bmatrix} \text{Re}(\hat{c}) \\ \text{Im}(\hat{c}) \end{bmatrix} = [(G^H_{n,i} G_{n,i})^{-1} G^H_{n,i} f_{n,i}]_{\beta=\hat{\beta},\varphi=\hat{\varphi}} \qquad \text{Eq. (10)}$$

where $$G_{n,i} = \begin{bmatrix} 1+\beta & -\varphi \\ 0 & 1 \end{bmatrix},$$

$$f_{n,i} = \begin{bmatrix} \text{Re}\left(\frac{Y_{k,n,i}}{H_{k,n,i}} - \frac{1+\beta+e^{j\varphi}}{2} X_{0,n,i} + \frac{1+\beta-e^{j\varphi}}{2} X^*_{0,n,i}\right) \\ \text{Im}\left(\frac{Y_{k,n,i}}{H_{k,n,i}} - \frac{1+\beta+e^{j\varphi}}{2} X_{0,n,i} + \frac{1+\beta-e^{j\varphi}}{2} X^*_{0,n,i}\right) \end{bmatrix} \cdot (0.5)$$

Figure 7:
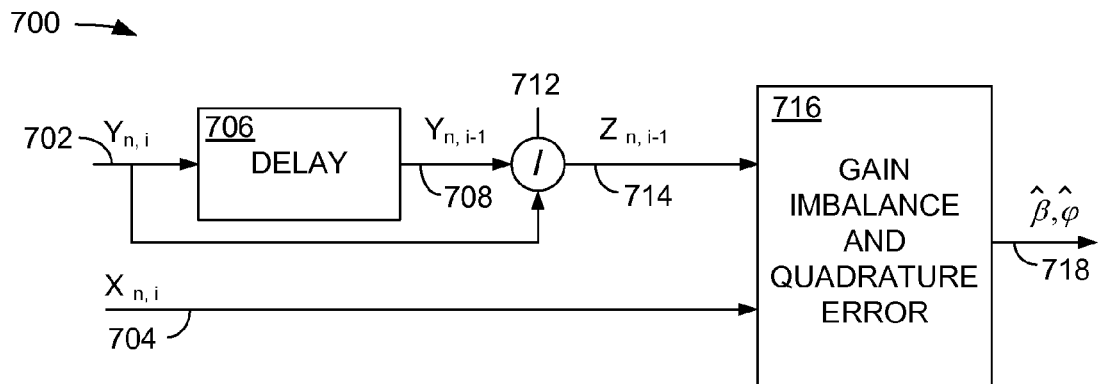
FIG. 7 is a schematic diagram illustrating an example of the measurement of gain imbalance and quadrature error.

FIG. 7 is a schematic diagram illustrating an example of the measurement of gain imbalance and quadrature error using Eq. (6). The signal $Y_{n,i}$ is supplied to a delay element 706 via connection 702. The delay element 706 registers a symbol received in a previous time slot so that the symbols received in the previous time slot ($Y_{n,i-1}$) and current time slot ($Y_{n,i}$) can be combined and sent to a divider 712 simultaneously. The output of the delay element 706 is the function $Y_{n,i-1}$ on connection 708 and is provided to the divider 712. The signal $Y_{n,i}$ is also supplied to the divider 712. The output of the divider 712 is the signal $Z_{n,i-1}$ on connection 714 and is supplied to a gain imbalance and quadrature error computation element 716. The signal $X_{n,i}$ is supplied to the gain imbalance and quadrature error computation element 716 via connection 704. The gain imbalance and quadrature error computation element 716 performs the computation provided in Equation (6) and provides signals representing the terms $\hat{\beta}$ and $\hat{\varphi}$ on connection 718.

Figure 8:
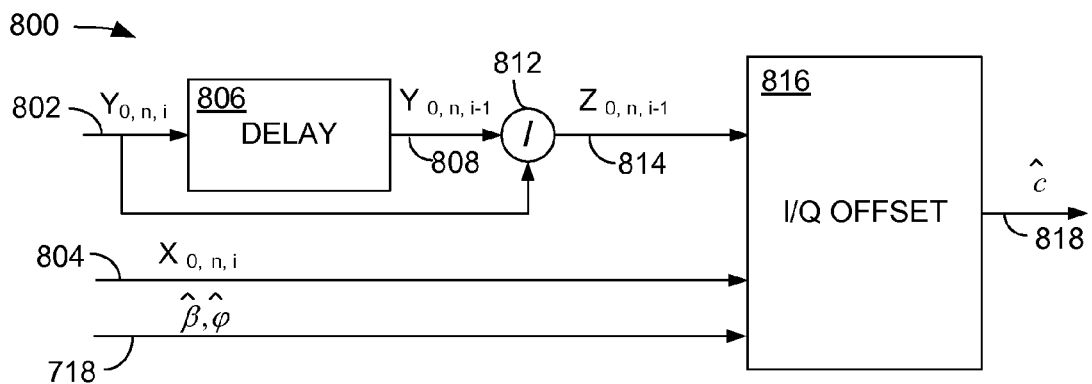
FIG. 8 is a schematic diagram illustrating an example of a first embodiment of the measurement of I/Q offset.

FIG. 8 is a schematic diagram illustrating an example of a first embodiment of the measurement of I/Q offset using Eq. (9). The signal $Y_{0,n,i}$ is supplied to a delay element 806 via connection 802. The delay element 806 is similar to the delay element 706. The output of the delay element 806 is the function $Y_{0,n,i-1}$ on connection 808 and is provided to a divider 812. The signal $Y_{0,n,i}$ is also supplied to the divider 812. The output of the divider 812 is the signal $Z_{0,n,i-1}$ on connection 814 and is supplied to an I/Q offset element 816.

The signal $X_{o,n,i}$ is supplied to the I/Q offset element 816 via connection 804. The signals representing the terms $\hat{\beta}$ and $\hat{\phi}$ are supplied to the I/Q offset element 816 via connection 718. The I/Q offset element 816 performs the computation provided in Equation (9) and provides a signal having the term c on connection 818. In the embodiment shown in FIGS. 7 and 8, the measurement of I/Q mismatch is performed prior to channel estimation.

Figure 9:
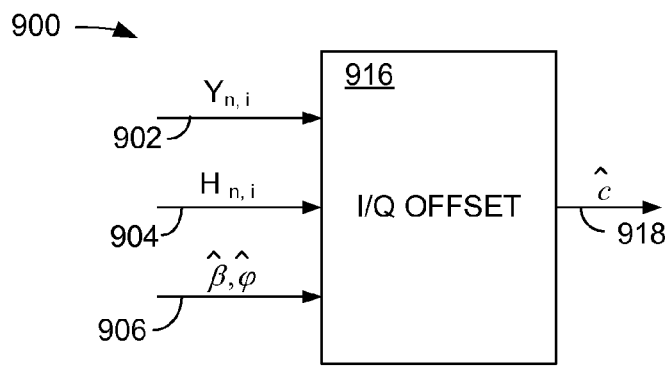
FIG. 9 is a schematic diagram illustrating an example of an alternative embodiment of the measurement of I/Q offset.

FIG. 9 is a schematic diagram illustrating an example of an alternative embodiment of the measurement of I/Q offset using Eq. (10). The signal $Y_{n,i}$ is supplied to an I/Q offset element 916 via connection 902, the signal $H_{n,i}$ is supplied to the I/Q offset element 916 via connection 904 and the signals $\hat{\beta}$ and $\hat{\phi}$ are supplied to the I/Q offset element 916 via connection 906. The I/Q offset element 916 performs the computation provided in Equation (10) and provides the signal c on connection 918. In the embodiment shown in FIGS. 7 and 9, the measurement of I/Q mismatch is performed after the channel estimation.

Embodiment 2

Transmitter and Receiver Wirelessly Connected (General Application)

If the channel is a general fading channel rather than a cable connection, the received signal at the $n^{th}$ Rx stream involves contributions from all the transmitter antennas.

$$Y_{k,n,i} = \sum_{m=1}^{P} \left\{ H_{k,n,m,i} \left[ \frac{1+\beta_m+e^{j\varphi_m}}{2} X_{k,m,i} + \frac{1+\beta_m-e^{j\varphi_m}}{2} X^*_{N-k,m,i} + \left( \frac{1+\beta_m+e^{j\varphi_m}}{2} c_m + \frac{1+\beta_m-e^{j\varphi_m}}{2} c^*_m \right) \delta(k) \right] + W_{k,m,i} \right\} \quad \text{Eq. (11)}$$

where $H_{k,n,m,i}$ is the frequency response at the $k^{th}$ subcarrier of the $i^{th}$ OFDM symbol transmitted from the $m^{th}$ transmitter antenna to the $n^{th}$ Rx stream. P is the number of transmitter antennas.

Because on the right side of Eq. (11) there are several different channel responses $H_{k,n,m,i}$ Eq. (4) cannot be employed to eliminate the influences of channel responses. Direct joint estimation of channel response and I/Q mismatch parameters is a possible solution for the problem, but is very complex.

In accordance with an embodiment of the system and method for in-phase/quadrature-phase (I/Q) mismatch measurement and compensation, the received signal is defined as an incomplete observation set for estimation of parameters and the first step is to construct a complete observation set based on the incomplete set to simplify the estimation of parameters. Eq. (11) is rewritten in vector mode as $$Y_{n,i} = \sum_{m=1}^{P} Y_{n,m,i} = \sum_{m=1}^{P} (T_{n,m,i} W^H h_{n,m,i}) \quad \text{Eq. (12)}$$

where $$2T_{n,m,i} = (1+\beta_m+e^{j\varphi_m})X_{n,m,i} + (1+\beta_m-e^{j\varphi_m})JX^*_{n,m,i}J \quad \text{Eq. (13)}$$

The signal representing the term $Y_{n,i}$ defines the incomplete set of received vectors at the $n^{th}$ Rx stream of the $i^{th}$ OFDM symbol, the term $h_{n,m,i}$ is the time domain channel response vector between the $m^{th}$ transmitter antenna and the $n^{th}$ Rx stream, the terms W and J are IDFT (Inverse Discrete Fourier Transform) matrix and exchange matrix, respectively. In accordance with an embodiment, the complete set $\hat{Y}_{l,n,m,i}^{(s)}$ is defined as $$\hat{Y}_{l,n,m,i}^{(s)} = \hat{T}_{n,m,i}^{(s-1)}[W(l,:)]^H \hat{h}_{l,m,n,i}^{(s-1)} + \alpha_{l,n} \left\{ Y_{n,i} - \sum_{m=1}^{P} \sum_{l=1}^{L} \hat{T}_{n,m,i}^{(s-1)}[W(l,:)]^H \hat{h}_{l,m,n,i}^{(s-1)} \right\} \quad \text{Eq. (14)}$$

where $\hat{T}_{n,m,i}^{(s)} = [T_{n,m,i}]_{\beta=\hat{\beta}_m^{(s)}, \varphi=\hat{\varphi}_m^{(s)}}$ and s is the iteration index. $\hat{Y}_{l,n,m,i}^{(s)}$ is the received vector of the $i^{th}$ OFDM symbol from the $u^{th}$ path between the $m^{th}$ transmitter antenna and $n^{th}$ Rx stream at the $s^{th}$ iteration, $\alpha_{l,n}$ are constant factors with respect to $$\sum_{l=1}^{L} \alpha_{l,n} = 1.$$

The terms P and U are the number of transmitter antennas and paths of channel responses, respectively.

The objective is to obtain $\hat{\beta}_m^{(s)}$, $\hat{\varphi}_m^{(s)}$ and $\hat{h}_{l,m,n,i}^{(s)}$ based on $Y_{l,n,m,i} = \hat{Y}_{l,n,m,i}^{(s)}$ using an ML (Maximum Likelihood) approach, update the current values of parameters from estimation results, and then estimate another subset of parameters until values of all the parameters are obtained.

The steps of proposed method are described as below:
Expectation Step:
Evaluate (14) with $\hat{\beta}_m^{(s-1)}$, $\hat{\varphi}_m^{(s-1)}$ and $\hat{h}_{l,m,n,i}^{(s-1)}$
Maximization Step:
Resolve $$\{\hat{\beta}_m^{(s)}, \hat{\varphi}_m^{(s)}, \hat{h}_{l,m,n,i}^{(s)}\} = \min_{\beta_m,\varphi_m,h_{l,m,n,i}} \left\{ \left\| Y_{l,n,m,i} - \hat{Y}_{l,n,m,i}^{(s)} \right\|^2 \right\}$$

with ML approach.

Return to expectation step with estimation results from maximization step.

Proceed until results converge.

Using wireless connection measurement, the estimation of $c_m$ (I/Q offset) is performed after compensation of gain imbalance and quadrature error with estimation results in last iteration and channel estimation as described in Eq. (10).

Figure 10:
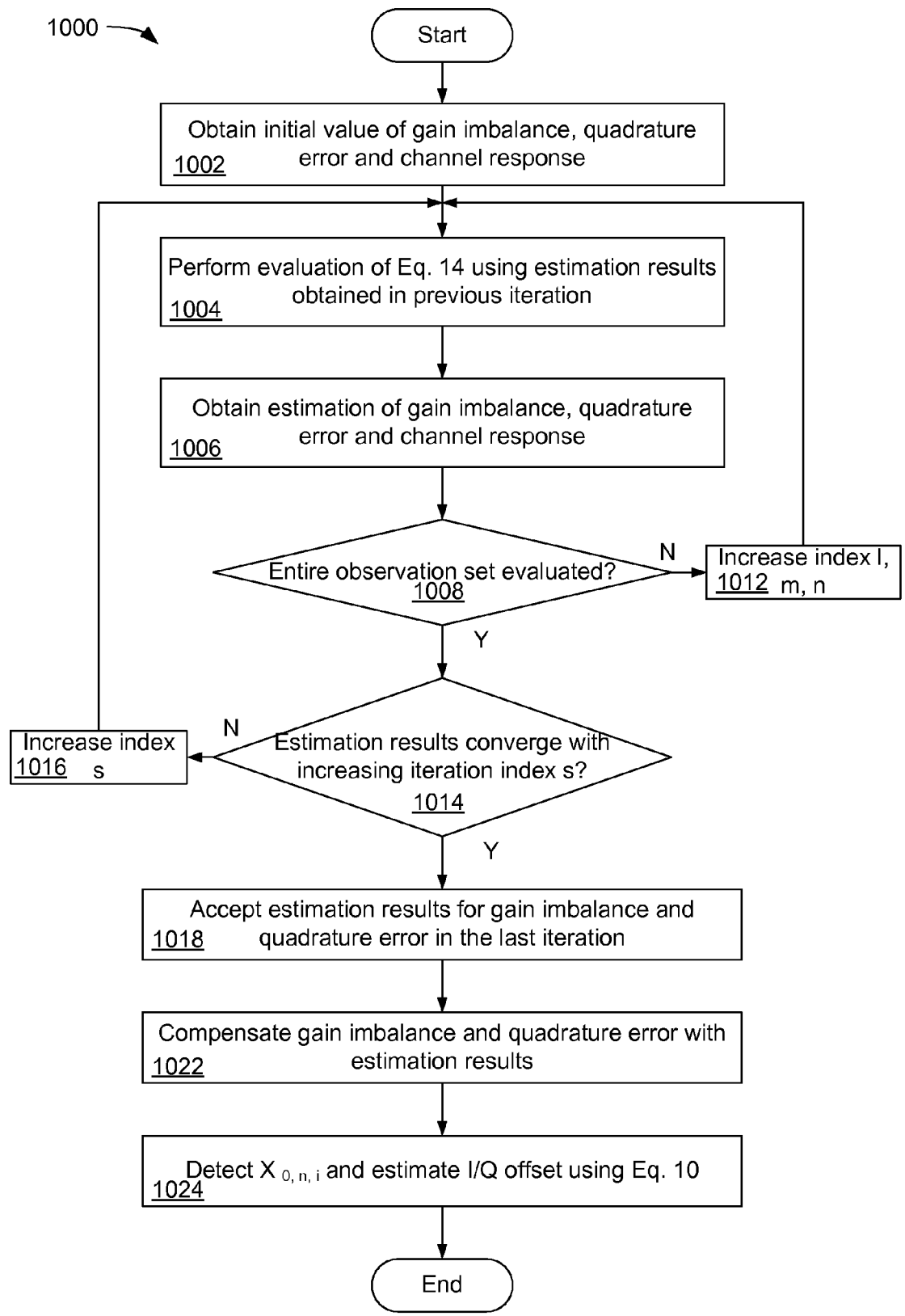
FIG. 10 is a flowchart showing the operation of an embodiment of the system and method for in-phase/quadrature-phase (I/Q) mismatch measurement and compensation.

FIG. 10 is a flowchart showing the operation of an embodiment of the system and method for in-phase/quadrature-phase (I/Q) mismatch measurement and compensation.

In block 1002, initial values of gain imbalance, quadrature error and channel response are obtained. Typically, the initial values for gain imbalance and quadrature error are set to zero. The initial value for channel response is obtained from known parts of the received signal, such as from a preamble or pilot portion of the signal.

In block 1004, the estimation results of gain imbalance, quadrature error and channel response from the previous iteration are used to evaluate $T_{n,m,i}$ using Eq. 13 and then $T_{n,m,i}$ used to evaluate Eq. 14. In block 1006, estimates for gain imbalance, quadrature error and channel response using the equation $$\left\{\hat{\beta}_m^{(s)}, \hat{\varphi}_m^{(s)}, \hat{h}_{l,m,n,i}^{(s)}\right\} = \min_{\beta_m,\varphi_m,h_{l,m,n,i}} \left\{\left\|Y_{l,n,m,i} - \hat{Y}_{l,n,m,i}^{(s)}\right\|^2\right\}$$

are obtained.

Figure 11:
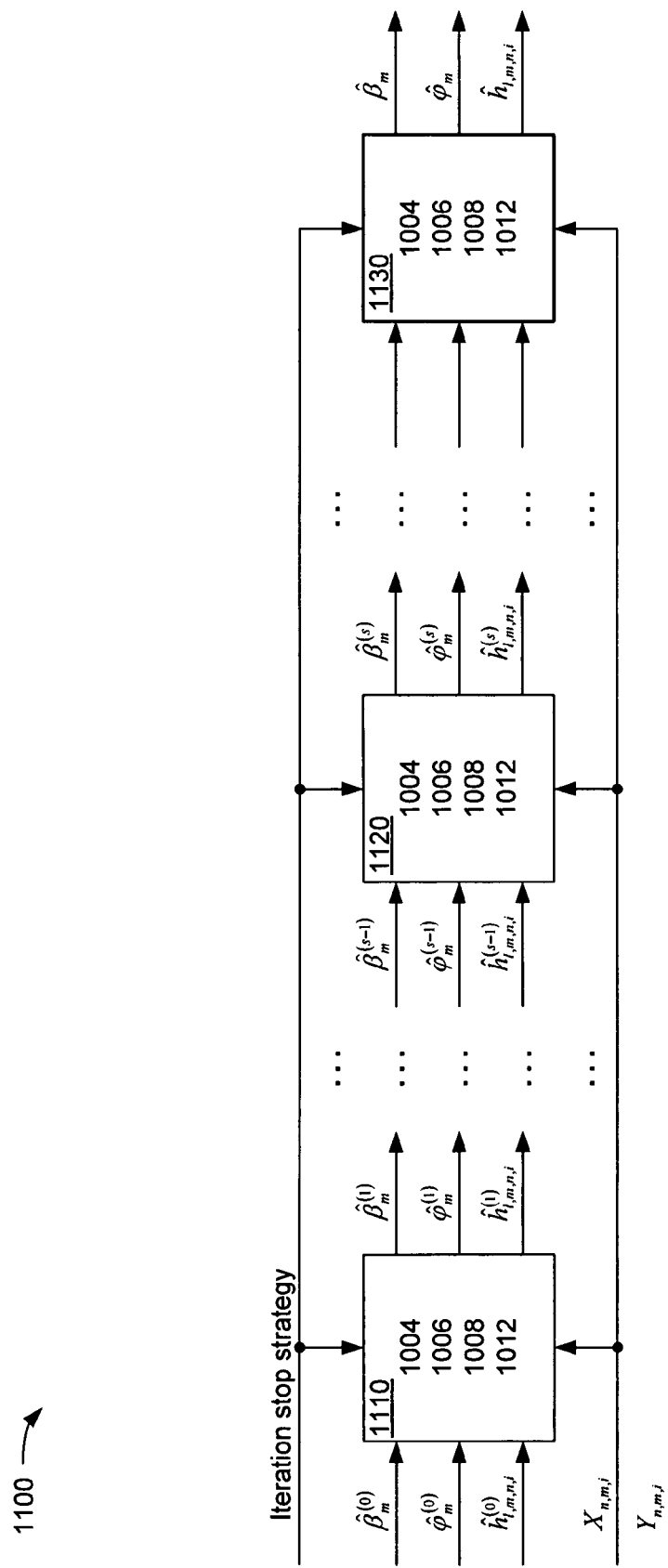
FIG. 11 is a schematic diagram illustrating the measurement of gain imbalance and quadrature error with general channel fading, where the iteration follows the flow in FIG. 10.
Figure 12:
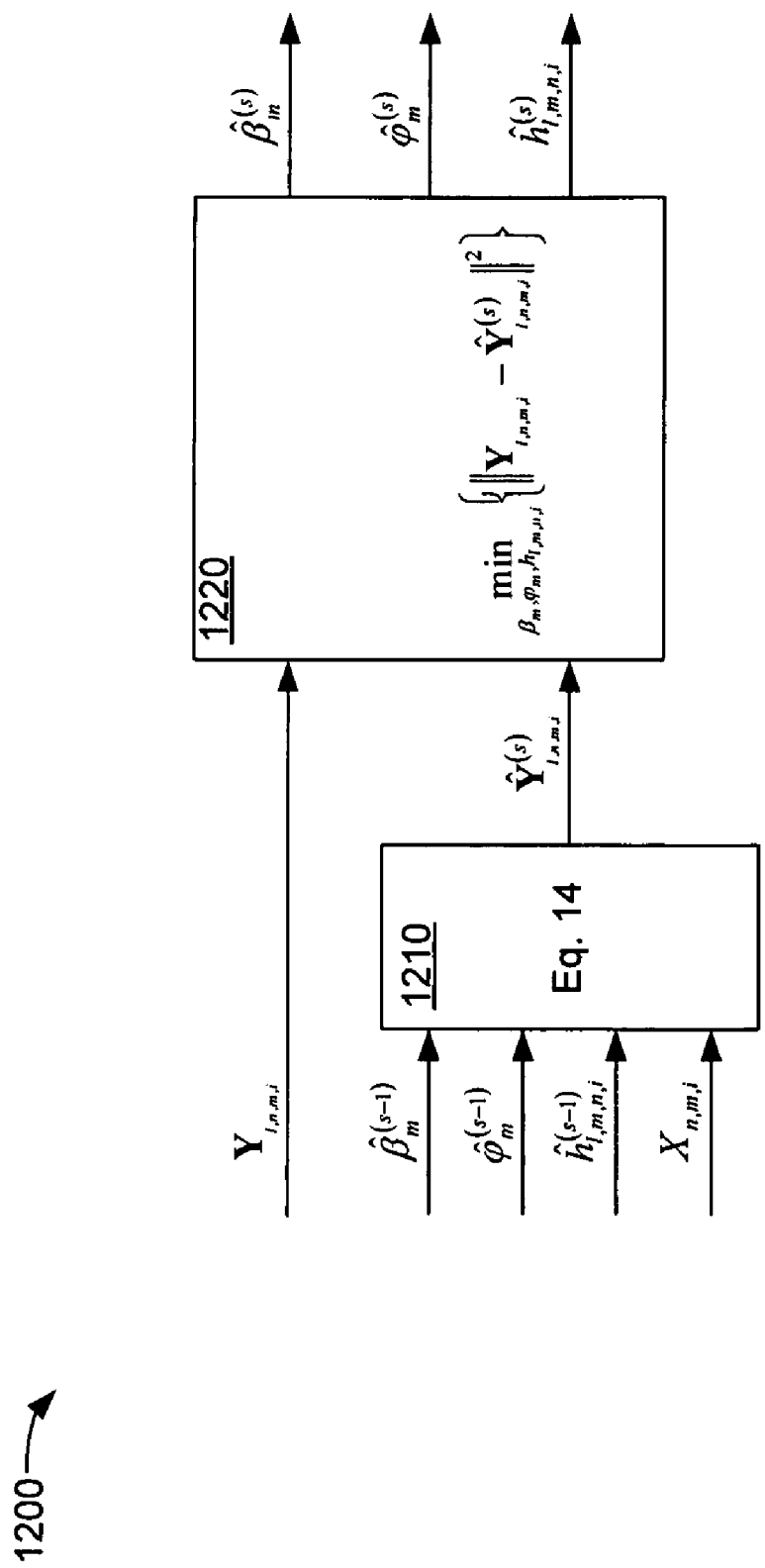
FIG. 12 is a schematic diagram illustrating an example of one of the iteration blocks of FIG. 1.

The process of blocks 1004 and 1006 are graphically represented in FIGS. 11 and 12.

FIG. 11 is a schematic diagram illustrating the measurement of gain imbalance and quadrature error with general channel fading, where the iteration follows the flow in FIG. 10. The blocks 1110, 1120 and 1130 depict iterations of blocks 1004, 1006, 1008 and 1012 of FIG. 10.

FIG. 12 is a schematic diagram illustrating an example of one of the blocks 1110, 1120 and 1130 of FIG. 11. Block 1210 performs the functionality of block 1004 of FIG. 10 using Eq. 14. In block 1220, estimates for gain imbalance, quadrature error and channel response using the equation $$\left\{\hat{\beta}_m^{(s)}, \hat{\varphi}_m^{(s)}, \hat{h}_{l,m,n,i}^{(s)}\right\} = \min_{\beta_m,\varphi_m,h_{l,m,n,i}} \left\{\left\|Y_{l,n,m,i} - \hat{Y}_{l,n,m,i}^{(s)}\right\|^2\right\}$$

are obtained.

In block 1008, it is determined whether the entire observation set has been evaluated. If the entire evaluation set has not been evaluated, then, in block 1012, the indices l, m and n are incremented and the process returns to block 1004.

If, in block 1008 it is determined that the entire observation set has been evaluated, then, in block 1014, it is determined whether the estimation results converge with increasing iterations of the index, s. If the estimation results do not converge with increasing iterations of the index, s, then, in block 1016, the index, s, is incremented and the process returns to block 1004.

If it is determined in block 1014 that the estimation results converge with increasing iterations of the index, s, then, in block 1018, the estimation results for gain imbalance and quadrature error for the last iteration are accepted. In block 1022 the gain imbalance and the quadrature error are compensated using the estimation results of block 1018. In block 1024, the term $X_{0,n,i}$ is detected and the I/Q offset is estimated using Eq. 10.

Embodiment 3

Transmitter and Receiver Wirelessly Connected (No Spatial Extension)

If spatial extension is not applied in a diversity MIMO system, a simpler approach to determine and compensate I/Q mismatch measurement can be employed. For example, in a MIMO OFDM system based on the IEEE 802.11n standard, with P transmitters and L receivers, the $k^{th}$ received subcarrier of training symbols at the $l^{th}$ receiver can expressed as $$R_k = P^T(Q_k^T a[H_k(q,:)]^T T_k + Q_{N-k}^* b[H_k(q,:)]^T T_{N-k}^*) + V_k \quad \text{Eq. (15)}$$

where $R_k = [R_{k,1} \ldots R_{k,P}]$ is observed in P symbol durations at the $l^{th}$ receiver.

The term $a = \text{diag}([a_1 \ldots a_P])$, $b = \text{diag}([b_1 \ldots b_P])$ is the I/Q mismatch vector. $T_k$ refers to the training symbols at $k^{th}$ subcarriers.

The estimated channel response using training sequences can represented as $$[\hat{H}_k(q,:)]^T = (P^*P^T)^{-1}P^*P_k T_k^{-1} \cong Q_{N_k}{}^H b[H_k(q,:)]^T \\ T_{N_k}*T_k^{-1} \quad \text{Eq. (16)}$$

The channel matrix for symbol detection is obtained as $$\hat{H}_k = \begin{bmatrix} \hat{H}_k(1,:) \\ \vdots \\ \hat{H}_k(Q,:) \end{bmatrix}$$

$$\approx \begin{bmatrix} H_k(1,:) \\ \vdots \\ H_k(Q,:) \end{bmatrix} aQ_k + \begin{bmatrix} H_k(1,:) \\ \vdots \\ H_k(Q,:) \end{bmatrix} \text{diag}_{Q \times Q}(T_{N-k}^* T_k^{-1}) bQ_{N-k}^*$$

$$= \begin{bmatrix} H_k(1,:) \\ \vdots \\ H_k(Q,:) \end{bmatrix} [aQ_k + \text{diag}_{P \times P}(T_{N-k}^* T_k^{-1}) bQ_{N-k}^*]$$

$$= H_k(aQ_k + T_{N-k}^* T_k^{-1} bQ_{N-k}^*)$$

$$= H_k G_k$$

where $T_k = \text{diag}_{P \times P}(T_k)$

At the receiver, received symbols can be represented as $$Y_k = H_k(aQ_k X_k + bQ_{N-k}^* X_{N-k}) + V_k \quad \text{Eq. (17)}$$

where $X_k = [X_{k,1} \ldots X_{k,S}]^T$ is the transmitted symbols at S spatial streams, $Y_k = [Y_{k,1} \ldots Y_{k,Q}]^T$ are the received symbols at the L receivers.

If the estimated channel is used for symbol detection, recovered symbols can be written as $$Z_k = (\hat{H}_k^H \hat{H}_k)^{-1} \hat{H}_k^H Y_k \cong (G_k^H H_k^H H_k G_k)^{-1} G_k^H H_k^H H_k \\ (aQ_k X_k + bQ_{N-k}^* X_{N-k}) \quad \text{Eq. (18)}$$

If $G_k$ is a square matrix, i.e. $Q_k$ is a square matrix, then $$Z_k = (\hat{H}_k^H \hat{H}_k)^{-1} \hat{H}_k^H Y_k \cong G_k^{-1}(aQ_k X_k + bQ_{N-k}^* X_{N-k}^*) \quad \text{Eq. (19)}$$

It can be obtained from previous analysis that $a = I + g$ and $b = g^*$, where $$g = \frac{\beta + j\varphi}{2}$$

$$\beta = \text{diag}([\beta_1 \cdots \beta_P])$$

$$\varphi = \text{diag}([\varphi_1 \cdots \varphi_P])$$

From Eq. (19), it can derived that $$C \begin{bmatrix} g_r(:) \\ g_i(:) \end{bmatrix} = D \quad \text{Eq. (20)}$$

$$C_k = \begin{bmatrix} \\ \text{Re}(\text{diag}[Q_k(X_k - Z_k) + Q_{N-k}^* X_{N-k}^* - T_{N-k}^* T_k^{-1} Q_{N-k}^* Z_k]) \\ \text{Im}(\text{diag}[Q_k(X_k - Z_k) + Q_{N-k}^* X_{N-k}^* - T_{N-k}^* T_k^{-1} Q_{N-k}^* Z_k]) \end{bmatrix}$$

-continued where $$D_k = \begin{bmatrix} \text{Re}(diag[Q_k(X_k - Z_k)j - Q_{N-k}^* X_{N-k}^* j + T_{N-k}^* T_k^{-1} Q_{N-k}^* Z_k j]) \\ \text{Im}(diag[Q_k(X_k - Z_k)j - Q_{N-k}^* X_{N-k}^* j + T_{N-k}^* T_k^{-1} Q_{N-k}^* Z_k j]) \end{bmatrix}$$

$$D_k = \begin{bmatrix} \text{Re}[Q_k(Z_k - X_k)] \\ \text{Im}[Q_k(Z_k - X_k)] \end{bmatrix}$$

$$C = \begin{bmatrix} C_{k_1} \\ \vdots \\ C_{k_M} \end{bmatrix} \text{ and } D = \begin{bmatrix} D_{k_1} \\ \vdots \\ D_{k_M} \end{bmatrix}$$

The solution to Eq. (20) is $$\begin{bmatrix} \hat{g}_r(:) \\ \hat{g}_i(:) \end{bmatrix} = (C^H C)^{-1} C^H D \quad \text{Eq. (21)}$$

Then gain imbalance and quadrature error can obtained by $$\hat{\beta}(:) = 2\hat{g}_r(:) \quad \text{Eq. (22)}$$

$$\hat{\phi}(:) = 2\hat{g}_i(:) \quad \text{Eq. (23)}$$

Figure 13:
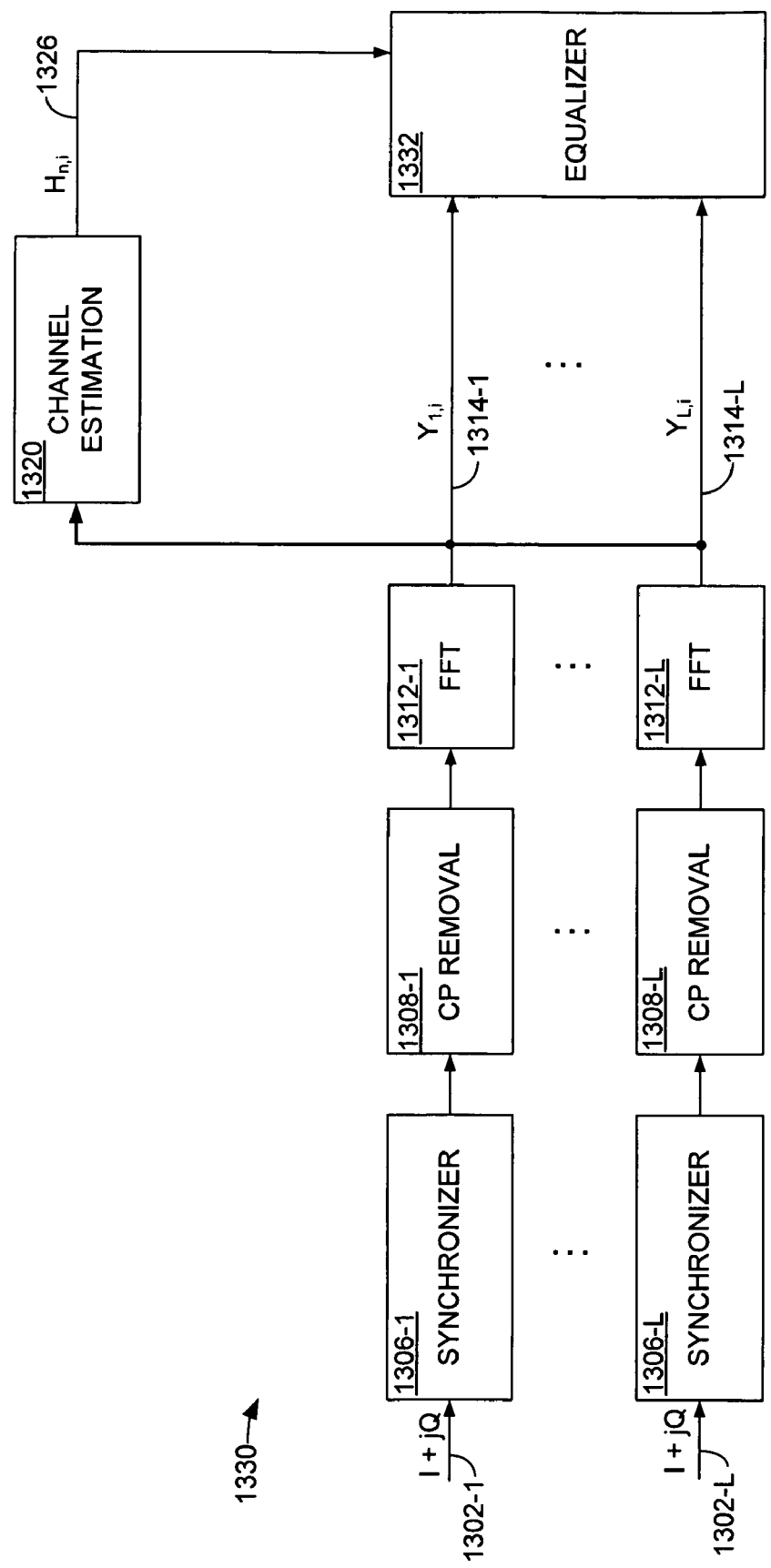
FIG. 13 is a block of an alternative embodiment of the Rx baseband module of FIG. 6.

The structure is of the measurement of gain imbalance and quadrature error using this approach is given in FIG. 13. FIG. 13 is a block diagram of an alternative embodiment of the Rx baseband module of FIG. 6. In FIG. 13, the I/Q mismatch measurement is implemented in an equalizer.

For each channel, the in-phase (I) and quadrature-phase (Q) signals received from the demodulator 320 (FIG. 3) are combined into complex form (I+jQ) and provided to a synchronizer 1306. In the example shown in FIG. 13, the signal on connection 1302-1 is provided to a synchronizer 1306-1 and the signal on connection 1302-L is provided to a synchronizer 1306-L. The number of synchronizers corresponds to the number of channels (i.e., the number of transmitters, P (FIG. 1) and receivers, L (FIG. 1)).

After synchronization, each receive signal is provided to a corresponding cyclic prefix removal element 1308-1 through 1308-L. The cyclic prefix removal element 1308-1 is similar to the cyclic prefix removal element 608-1 described above.

After the cyclic prefix is removed from each receive signal, the receive signals are supplied to corresponding fast Fourier transform (FFT) elements 1312.

The FFT elements 1312-1 through 1312-L convert the receive signals to the frequency domain. The output of the FFT element 1312-1 is supplied over connection 1314-1 and is referred to as $Y_{1,j}$. The output of the FFT element 1312-L is supplied over connection 1314-L and is referred to as $Y_{L,j}$. As used in FIG. 13, the first term in the subscript ($Y_{1,j}$) refers to the first channel in FIG. 1 and the first term in the subscript ($Y_{L,j}$) refers to the last channel, L, in FIG. 1.

The output of the FFT elements 1312-1 through 1312-L is used for I/Q mismatch measurement and channel estimation. However, the I/Q mismatch is performed in the equalizer 1332, as will be described below.

The signals on connections 1314-1 and 1314-L are supplied to an equalizer 1332 and to a channel estimation element 1320. The channel estimation element 1320 measures the response of the channel and provides an indicator, $H_{n,i}$, that is a term that defines the channel response. The measurement results can be sent to the equalizer 1332 for compensation of I/Q mismatch. The compensation can be performed using either the real time measurement results or using results stored some time before, as described above with the exception that Eq. 17 is used in this example.

Figure 14:
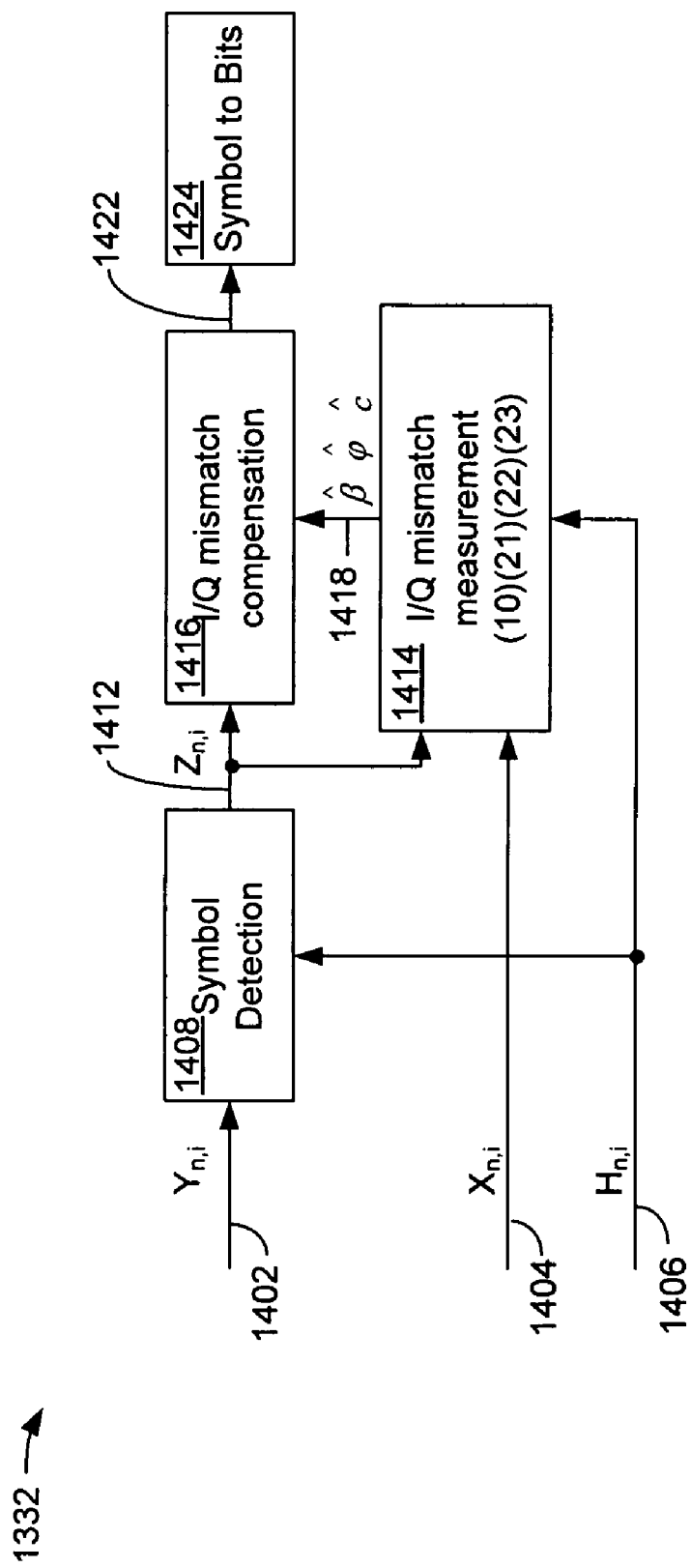
FIG. 14 is a block diagram illustrating the equalizer of FIG. 13.

FIG. 14 is a block diagram illustrating an embodiment of the equalizer of FIG. 13. The term $Y_{n,i}$ is supplied via connection 1402 to a symbol detection element 1408. In the term $Y_{n,i}$, n is a variable that can have any value from 1 to L, so it covers $Y_{1,i}$ to $Y_{L,i}$. The symbol detection element 1408 operates similar to an equalizer, but it only removes the effects of the channel and ignores the effect of I/Q mismatch. The symbol detection element 1408 provides the term $Z_{n,i}$ over connection 1412 to the I/Q mismatch compensation element 1416.

The term $X_{n,i}$ is a known part of the transmitted signal and can be saved in registers in the equalizer 1332. The term $X_{n,i}$ is shown schematically supplied via connection 1404 to the I/Q mismatch measurement element 1414, and the term $H_{n,i}$ is supplied via connection 1406 to the I/Q mismatch measurement element 1414. The term $H_{n,i}$ is also supplied via connection 1406 to symbol detection element 1408; and the terms $X_{n,i}$ and $Z_{n,i}$ are supplied over respective connections 1404 and 1412 to the I/Q mismatch measurement element 1414. The I/Q mismatch measurement element 1414 provides the terms $\hat{\beta}$ $\hat{c}$ and $\hat{\phi}$ to the I/Q compensation element 1416 via connection 1418. The I/Q mismatch measurement element 1414 obtains the terms $\hat{\beta}$ and $\hat{\phi}$ using equations 21, 22 and 23. The terms $\hat{\beta}$ and $\hat{\phi}$ are then provided to equation 10 to obtain the term $\hat{c}$.

The compensation performed by the I/Q mismatch compensation element 1416 can be performed as described above, with the exception that Eq. 17 is used in this example.

The output of the I/Q compensation element 1416 is provided over connection 1422 to a symbol-to-bit converter 1424. The symbol-to-bit converter converts the symbols on connection 1422 to bits.

Figure 15:
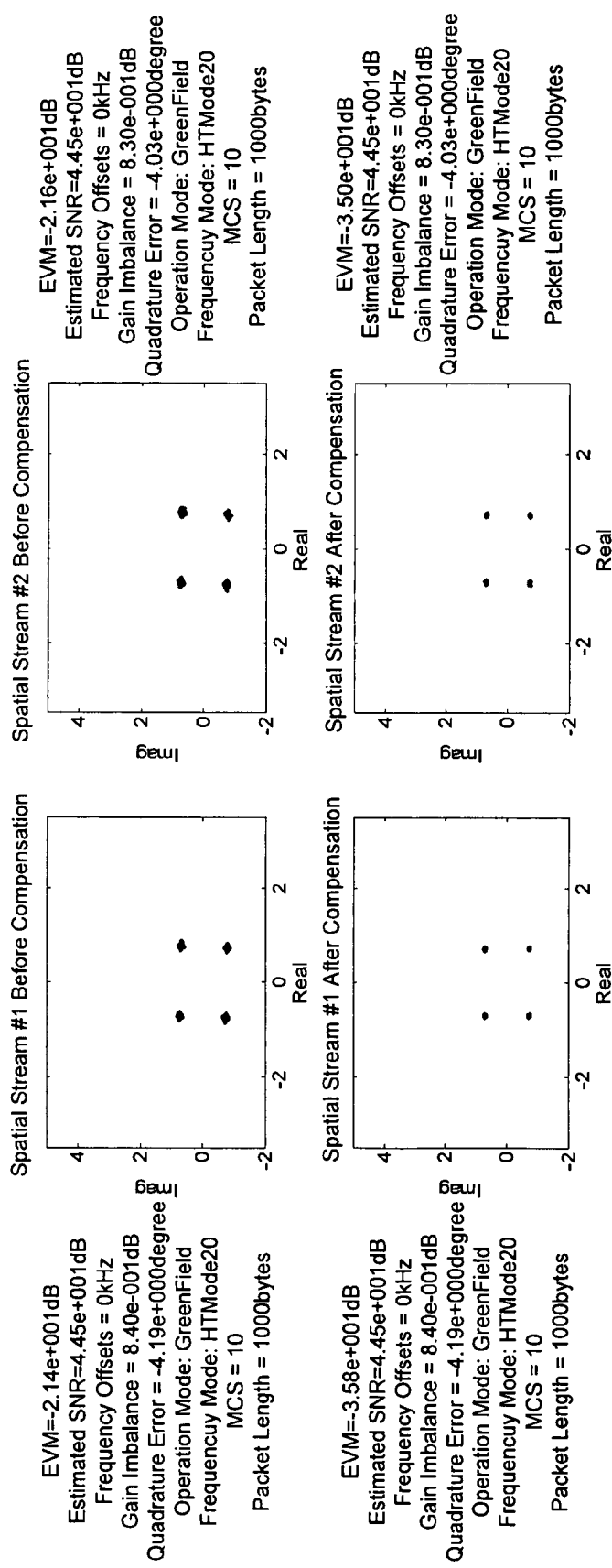
FIG. 15 is a graphical illustration showing the results of the operation of the first embodiment of the system and method for in-phase/quadrature-phase (I/Q) mismatch measurement and compensation.

FIG. 15 is a graphical illustration showing the results of the operation of the first embodiment of the system and method for in-phase/quadrature-phase (I/Q) mismatch measurement and compensation. FIG. 15 shows an example of real values for I/Q impairments set in an I/Q waveform that is downloaded to an Agilent E4438c ESG (Electronic Signal Generator).

Figure 16:
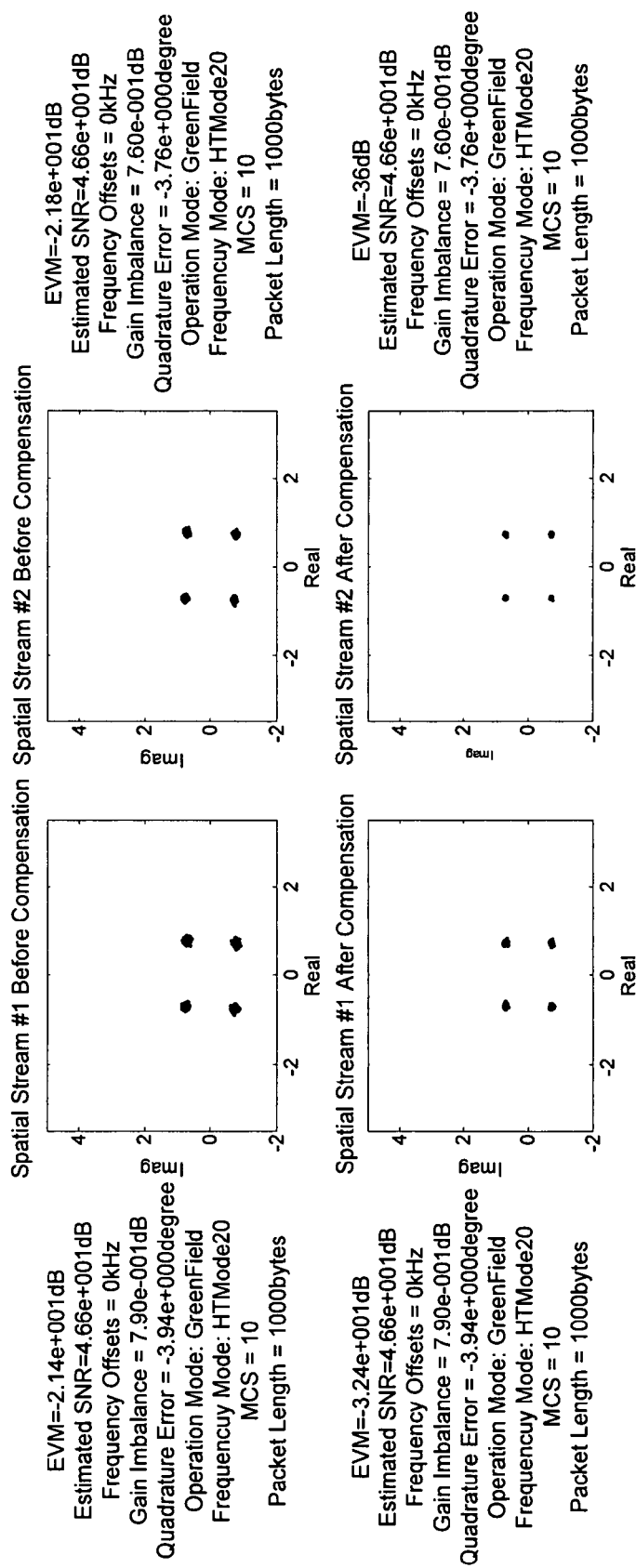
FIG. 16 is a graphical illustration showing the results of the operation of the second embodiment of the system and method for in-phase/quadrature-phase (I/Q) mismatch measurement and compensation.

FIG. 16 is a graphical illustration showing the results of the operation of the second embodiment of the system and method for in-phase/quadrature-phase (I/Q) mismatch measurement and compensation. FIG. 16 shows an example of real values for I/Q impairments set in an I/Q waveform that is downloaded to an Agilent E4438c ESG.

Figure 17:
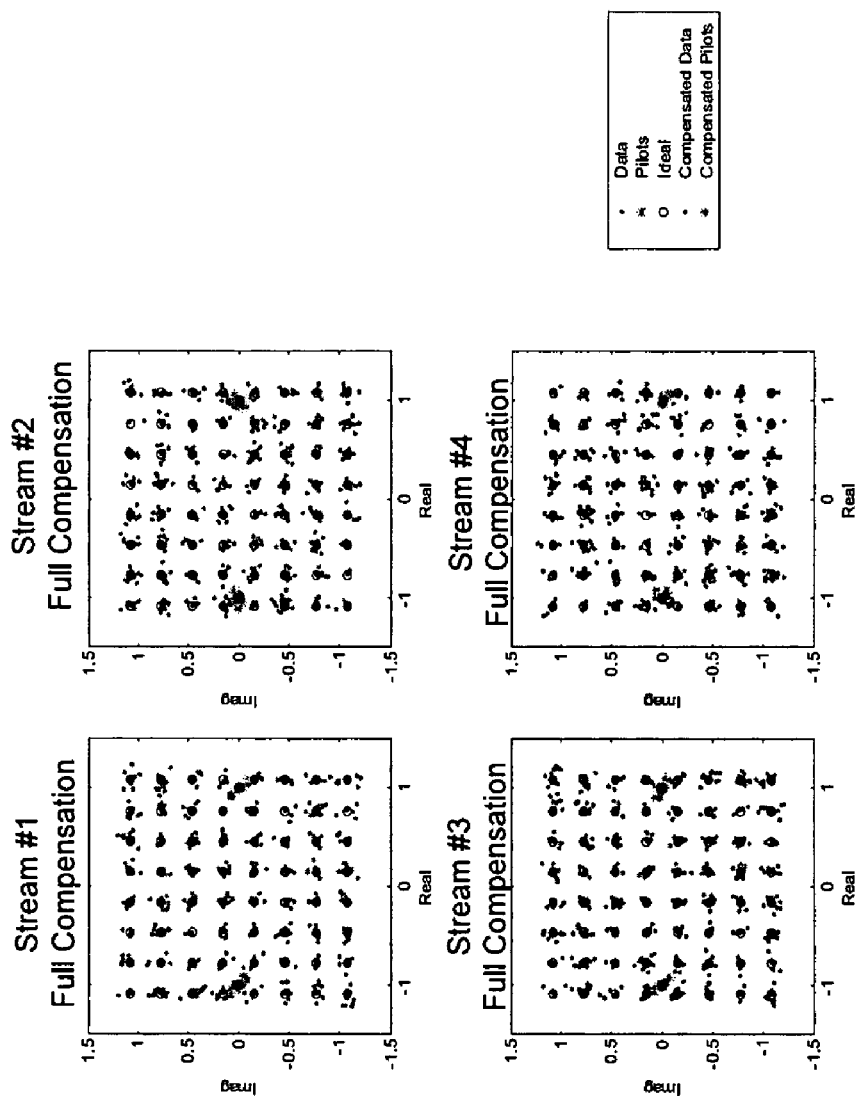
FIG. 17 is a graphical illustration showing the results of the operation of the third embodiment of the system and method for in-phase/quadrature-phase (I/Q) mismatch measurement and compensation.

FIG. 17 is a graphical illustration showing the results of the operation of the third embodiment of the system and method for in-phase/quadrature-phase (I/Q) mismatch measurement and compensation. FIG. 17 shows an example of real values for I/Q impairments set in an I/Q waveform that is downloaded to an Agilent E4438c ESG.

The foregoing detailed description has been given for understanding exemplary implementations of the invention and no unnecessary limitations should be understood therefrom as modifications will be obvious to those skilled in the art without departing from the scope of the appended claims and their equivalents.

What is claimed is:

1. A system for determining in-phase and quadrature-phase mismatch in a multiple-input, multiple-output (MIMO) communication architecture, comprising:
   at least one transmitter coupled to at least one receiver;
   an in-phase (I) signal, quadrature-phase (Q) signal mismatch element configured to receive i) I and Q signal components over at least one communication channel extending between the at least one transmitter and the at least one receiver, and ii) a signal indicating channel response, the I/Q signal mismatch element also configured to provide a signal representing gain imbalance, a signal representing quadrature error and a signal representing I/Q offset, in which the signal representing gain imbalance and the signal representing quadrature error are generated and used to generate the signal representing I/Q offset; and a channel estimation element configured to receive the I and Q signal components over the at least one communication channel, the channel estimation element also configured to provide the signal indicating channel response to the I/Q signal mismatch element.

2. The system of claim 1, in which the at least one transmitter and the at least one receiver are directly coupled together via a physical connection.

3. The system of claim 1, further comprising:
a plurality of transmitters coupled wirelessly to a corresponding plurality of receivers to form a plurality of transmitter-receiver pairs, in which each transmitter-receiver pair undergoes a fading channel condition and the signal representing gain imbalance, the signal representing quadrature error and the signal representing I/Q offset compensates for the fading channel condition.

4. The system of claim 1, further comprising:
an equalizer configured to receive the signal representing gain imbalance, the signal representing quadrature error and the signal representing I/Q offset, wherein the equalizer alters a receive signal to compensate for gain imbalance, quadrature error and I/Q offset.

5. The system of claim 1, in which the signal representing gain imbalance and the signal representing quadrature error are generated by computing a complete observation set using an estimated incomplete observation set.

6. The system of claim 5, in which the signal representing I/Q offset is generated after the complete observation set is generated.

7. A system for determining in-phase and quadrature-phase mismatch in a multiple-input, multiple-output (MIMO) communication architecture, comprising:
at least one transmitter coupled to at least one receiver over a plurality of wireless channels, in which each transmitter comprises a plurality of antennas and each receiver comprises a plurality of antennas; and an in-phase (I) signal, quadrature-phase (Q) signal mismatch element configured to receive i) I and Q signal components over a plurality of communication channels extending between the at least one transmitter and the at least one receiver, and ii) a signal indicating channel response, the I/Q signal mismatch element also configured to provide a signal representing gain imbalance, a signal representing quadrature error and a signal representing I/Q offset, in which the signal representing gain imbalance and the signal representing quadrature error are generated and used to generate the signal representing I/Q offset; and a channel estimation element configured to receive the I and Q signal components over the plurality of communication channels, the channel estimation element also configured to provide the signal indicating channel response to the I/Q signal mismatch element.

8. The system of claim 7, further comprising:
an equalizer configured to receive the signal representing gain imbalance, the signal representing quadrature error and the signal representing I/Q offset, wherein the equalizer alters a receive signal to compensate for gain imbalance, quadrature error and I/Q offset.

9. The system of claim 7, in which the signal representing gain imbalance and the signal representing quadrature error are generated by computing a complete observation set using an estimated incomplete observation set.

10. The system of claim 9, in which the signal representing I/Q offset is generated after the complete observation set is generated.

* * * * *